United States Patent
Luo et al.

(10) Patent No.: US 7,511,453 B2
(45) Date of Patent: Mar. 31, 2009

(54) METHOD AND APPARATUS FOR EXTENDING BATTERY LIFE BY ADAPTIVE CONTROL OF REGULATORS

(75) Inventors: Shiguo Luo, Austin, TX (US); John J. Breen, Harker Heights, TX (US)

(73) Assignee: Dell Products, L.P., Round Rock, TX (US)

( * ) Notice: Subject to any disclaimer, the term of this patent is extended or adjusted under 35 U.S.C. 154(b) by 396 days.

(21) Appl. No.: 11/409,402

(22) Filed: Apr. 21, 2006

(65) Prior Publication Data

US 2007/0247109 A1    Oct. 25, 2007

(51) Int. Cl.
*H01M 10/46* (2006.01)

(52) U.S. Cl. ...................................... 320/107

(58) Field of Classification Search ................ 320/107, 320/114, 141
See application file for complete search history.

(56) References Cited

U.S. PATENT DOCUMENTS

| | | | |
|---|---|---|---|
| 5,523,671 | A | 6/1996 | Stewart |
| 5,576,609 | A | 11/1996 | Brown et al. |
| 5,610,450 | A | 3/1997 | Saeki et al. |
| 5,773,966 | A | 6/1998 | Steigerwald |
| 6,137,265 | A | 10/2000 | Cummings et al. |
| 6,150,798 | A | 11/2000 | Ferry et al. |
| 2002/0079874 | A1 | 6/2002 | Horigan et al. |
| 2004/0195996 | A1 | 10/2004 | Nishida |
| 2004/0257048 | A1 | 12/2004 | Chagny |
| 2006/0033470 | A1 | 2/2006 | Zhu et al. |
| 2007/0063675 | A1 | 3/2007 | Walline et al. |

FOREIGN PATENT DOCUMENTS

| | | |
|---|---|---|
| EP | 0546652 A1 | 4/1992 |
| EP | 0632562 A2 | 6/1994 |
| EP | 0632562 A3 | 6/1994 |
| JP | 2051717 A | 2/1990 |

(Continued)

OTHER PUBLICATIONS

Co-Pending Application Entitled "AC-DC Adapter And Battery Charger Integration Scheme", U.S. Appl. No. 10/628,921, filed Jul. 29, 2003, 25 pgs.

(Continued)

*Primary Examiner*—Edward Tso
(74) *Attorney, Agent, or Firm*—O'Keefe, Egan, Peterman & Enders LLP (57) ABSTRACT

A method and system are disclosed for improving the efficiency of a battery supplied power supply system. More particularly, a method and system is provided for improving the voltage regulation efficiency for a system in which the input voltage that is to be regulated may vary widely. In the techniques disclosed, the voltage supply that is utilized for the drive control circuitry of the voltage regulators is varied in relation to variations in the input voltage. Thus in one embodiment, the voltage supply that is utilized for the circuitry that drives a control terminal of the output transistor of the regulation circuitry may be varied in relation to variations in the input voltage. For example, an inverse relationship may be established between the input voltage level and the voltage level that is used for the gate drive circuitry that controls the gates of regulator output transistors.

20 Claims, 5 Drawing Sheets

FOREIGN PATENT DOCUMENTS

| JP | 2001-136659 | 5/2001 |
|---|---|---|
| JP | 2002078324 A | 3/2002 |
| JP | 2001-136659 | 10/2004 |
| JP | 2004-304976 | 10/2004 |
| JP | 2005-304226 | 10/2005 |

OTHER PUBLICATIONS

Co-Pending Application Entitled "Systems And Methods For Regulating Pre-Charge Current In A Battery System", U.S. Appl. No. 11/034,624, filed Jan. 13, 2005, 26 pgs.

Microchip, Pic12F629/675 Data Sheet, "8-Pin Flash-Based 8-Bit CMOS Microcontrollers", 2003, 132 pgs.

Co-Pending Application Entitled "Systems And Methods For Integration Of Charger Regulation Within A Battery System", U.S. Appl. No. 11/058,781, filed Feb. 16, 2005, 30 pgs.

Intersil, "Synchronous Rectified MOSFET Driver", ISL6605, Data Sheet, Jan. 4, 2005, 9 pgs.

Intersil, "Synchronous Step Down Controller With Sourcing And Sinking LDO Regulator", ISL88550A, Data Sheet, Oct. 12, 2005, 25 pgs.

Maxim, "Integrated DDR Power-Supply Solutions For Desktops, Notebooks, And Graphic Cards", MAX8550/MAX8551, Rev. 2, Sep. 2004, 29 pgs.

Maxim, "Dual, High-Efficiency, Step-Down Controller With High Impedance In Shutdown", MAX8743, Rev. 1, Aug. 2005, 27 pgs.

Texas Instruments, "Complete DDR and DDR2 Memory Power Solution Synchronous Buck Controller, 3-A LDO, Buffered Reference", TPS51116, Apr. 2005, 37 pgs.

Search Report, GB0707620.1, Aug. 23, 2007, 2 pgs.

Search Report, SG200702795-6, Jul. 18, 2008, 4 pgs.

METHOD AND APPARATUS FOR EXTENDING BATTERY LIFE BY ADAPTIVE CONTROL OF REGULATORS

TECHNICAL FIELD OF THE INVENTION

This invention relates to techniques for controlling voltage regulators and more particularly to controlling voltage regulators to extend battery life.

BACKGROUND

Figure 1:
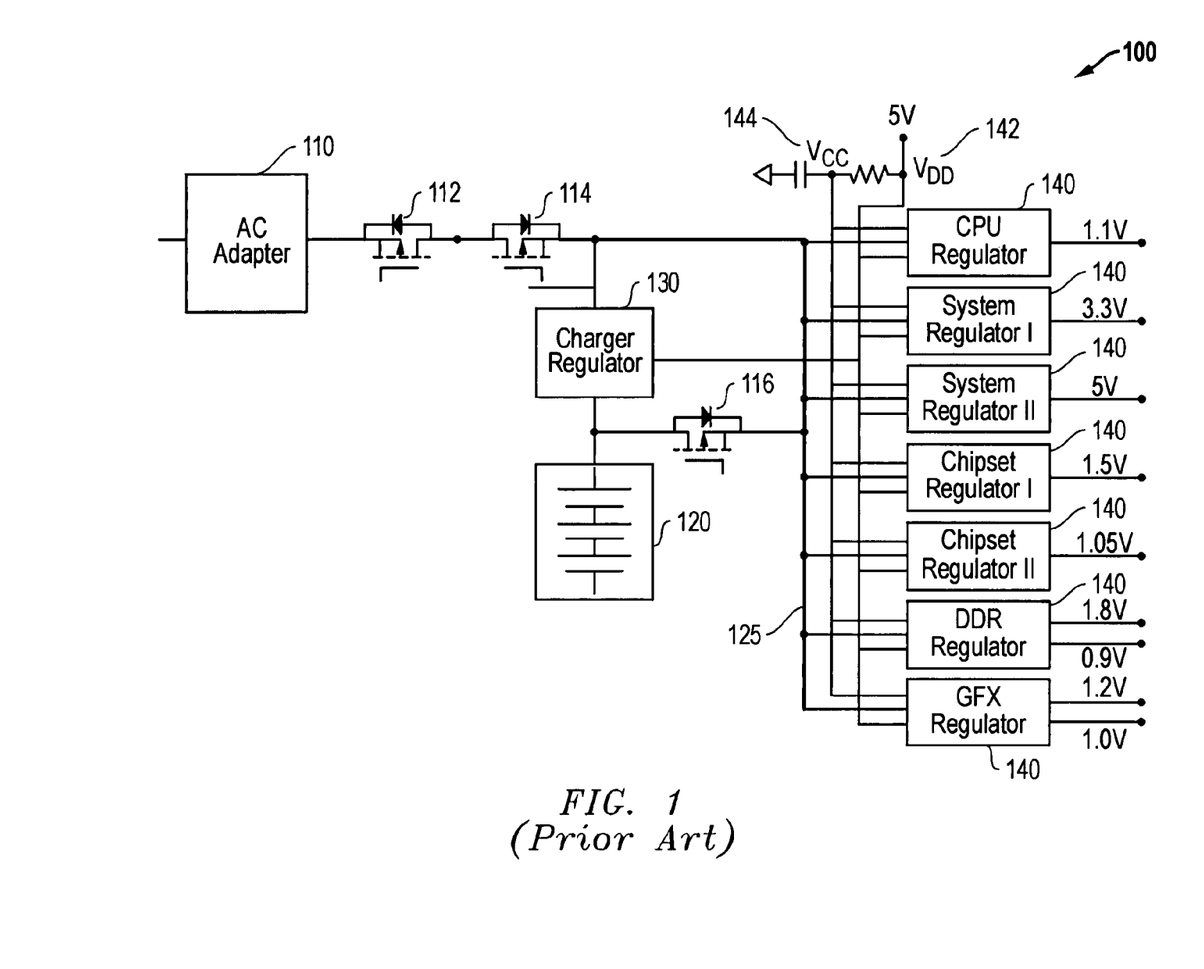
FIG. 1 illustrates a prior art information handling system having a battery power supply and voltage regulation

Battery supported power supplies are used for a variety of applications. Often a battery power supply must be regulated prior to being utilized in a system. For example, an exemplary system that utilizes voltage regulators in a battery supported power system 100 is shown in FIG. 1. As shown in FIG. 1, an AC power source may be obtained from an AC adaptor 110 which may be coupled, for example, to the public AC power grid. A battery 120 is also provided to provide a battery power source. As is known in the art, switches 112, 114, and 1116 and charger regulator 130 may be provided to select AC power from the AC adapter 110 or battery power from the battery 120 to provide the power for the supply rail Vin 125. As is also known, the switches may also be controlled to provide charging of the battery. For example, AC and battery supplied power systems are described in co-pending U.S. patent application Ser. No. 11/058,781, filed Feb. 16, 2005 entitled "Systems and Methods for Integration of Charger Regulation Within a Battery System" by Luo et al., the disclosure of which is expressly incorporated herein by reference.

As shown in FIG. 1, the power supply rail Vin 125 may be provided to a number of voltage regulators 140. In typical applications the rail Vin 125 may range from 9-20 volts. For example, when the AC adaptor 110 is being utilized the nominal input voltage level of Vin 125 may be 19.5V. However when the power supply system is supported by the battery, the minimum input voltage level may be as low as 9V. The voltage regulators 140 convert the voltage level of the rail Vin 125 to the necessary voltages required by battery supported power system 100 loads such as processor, chipsets, double data rate (DDR) memory and graphics cards. For example as shown in FIG. 1 the voltage regulators 140 are used to provide a number of regulated power supply rails ranging from 0.9-5V. The number, types, and output voltage levels of the regulators shown in FIG. 1 are merely exemplary and may vary depending upon a user's application and needs. One exemplary type of regulator in which the method introduced in this disclosure can be used is a general switching voltage regulator where Metal Oxide Silicon Field Effect Transistor (MOSFET) is used as power control switch. In one exemplary embodiment the voltage regulators may be "Buck" voltage regulators. Buck or "step-down" voltage regulators are regulators that are generally known to have an output voltage that is lower than an input voltage. Exemplary voltage regulators use controllers such as the Intersil ISL88550A, Maxim MAX8743 and the Texas Instrument TPS51116. The exemplary voltage regulators have a common feature that two auxiliary +5V power supply voltages are needed to support drive circuitry and control circuitry operations in the controller. Of these two power supply voltages, a +5V supply voltage called VCC or AVDD is the one after a RC filter. It will be recognized however that the concepts described herein are relevant to a wide range of other regulator types and that the regulators discussed herein are merely exemplary.

As shown in FIG. 1, the voltage regulators may receive power supply inputs in addition to the power circuitry input Vin rail that is being regulated. Thus, for example, as shown a Vdd supply input 142 may be utilized and a Vcc supply input 144 filtered by a RC filter after Vdd may also be utilized. As shown in more detail with regard to FIG. 2, the Vdd supply input 142 may act as a power supply for the MOSFET gate drive circuitry and the Vcc supply input 144 may act as a power supply for the analog and/or digital control circuitry within the regulator.

Figure 2:
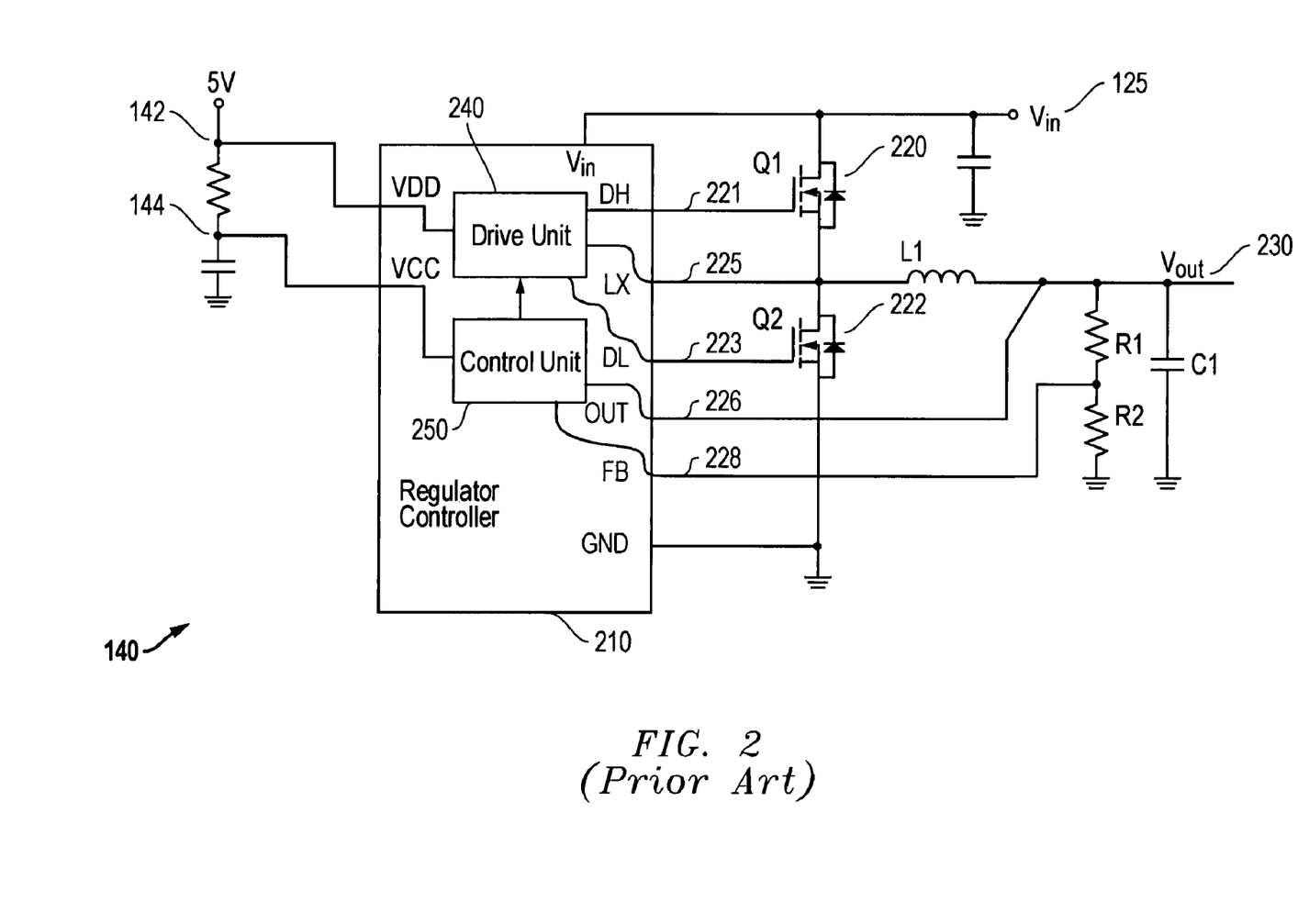
FIG. 2 illustrates a prior art voltage regulator.

FIG. 2 shows an exemplary application for regulator 140. As shown in FIG. 2 the regulator 140 may include a regulator integrated circuit 210, power MOSFETs 220 and 222 and a regulator system output 230. Power supply rails Vin 125, Vdd 142, and Vcc 144 are provided to the regulator integrated circuit 210 as shown. The MOSFETs 220 and 222 are controlled be gate driver outputs 221 and 223 respectively. The source of MOSFET 220 and drain of MOSFET 222 are also coupled to the regulator integrated circuit 210 at the LX pin 225 as shown. The OUT pin 226 senses the output voltage to determine if the regulator operates normally, otherwise a protection action may be taken by the control circuitry inside the controller. The FB pin 228 provides feedback to the control unit through a voltage divider (not shown). The control unit will compare the feedback signal with a preset reference voltage to determine the on-time duration for the high side switching MOSFET 220 and the low side MOSFET. The exemplary voltage regulator 140 may use, for example, a MAXIM MAX8550 voltage regulator integrated circuit. As shown in FIG. 2, drive circuitry 240 may be provided to provide the gate driver output voltages. Control unit 250 may provide the control signals for controlling the drive unit 240 appropriately in response to the signals on the OUT 226 AND FB 228 pins. The Vdd supply 142 may be provided as a supply for the drive unit 240 and the Vcc supply 144 after a RC filter on Vdd may be provided as a supply for the control unit 250.

The power efficiency of the regulator 140 is dependent (among other things) upon the MOSFET conduction loss. In particular, the drain-source resistance Rds(on) of MOSFET 222 can greatly impact the over all efficiency of the overall power supply system and corresponding impact the battery life of the battery utilized in such systems. It would be desirable to provide techniques that improve the efficiency of power supply systems, in particular the voltage regulation efficiency.

As shown in FIG. 1, the battery supported power supply system may be utilized to generate a variety of system output voltages such as CPU voltage rails, system voltage rails, chipset voltage rails, memory voltage rails, graphics card voltage rails, etc. Such output voltages are often used in information handling systems. As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A method and system are disclosed for improving the efficiency of a battery supplied power supply system. More particularly, a method and system is provided for improving the voltage regulation efficiency for a system in which the input voltage that is to be regulated may vary widely. In the techniques disclosed, the voltage supply that is utilized for the drive control circuitry of the voltage regulators is varied in relation to variations in the input voltage. Thus in one embodiment, the voltage supply that is utilized for the circuitry that drives a control terminal-gate of a MOSFETs of the regulation circuitry may be varied in relation to variations in the input voltage. For example, an inverse relationship may be established between the input voltage level and the voltage level that is used for the gate drive circuitry that controls the gates of regulator MOSFETs.

In one embodiment, a method of extending the battery life of a battery source in a battery supported power supply system having voltage regulation is provided. The method may comprise providing a first voltage supply to be regulated, the first voltage supply being generated at least at times from a battery source. Further, a voltage regulator that receives the first voltage supply is provided and a variable output drive control voltage that varies at least in part in relation to the voltage level of the first voltage supply is generated. The varying of the output drive control voltage in relation to the voltage level of the first voltage supply extends the life of the battery.

In another embodiment, a method of controlling the output drive control voltage of a voltage regulator is provided. The method comprises providing a first voltage supply to be regulated by the voltage regulator and utilizing a control unit voltage as a control unit power supply for at least a portion of the control circuitry of the voltage regulator. The method further comprises utilizing a drive unit voltage as a drive unit power supply for at least a portion of the drive circuitry of the voltage regulator, the drive circuitry controlling a drive signal that controls an output transistor of the voltage regulator. The method further includes varying the drive unit voltage such that the drive unit voltage level is dependent at least in part upon the voltage level of the first voltage supply; and providing a regulated output voltage from the voltage regulator. The efficiency of the voltage regulator is dependent upon the drive unit voltage.

In yet another embodiment, an information handling system is disclosed. The system may comprise a first voltage supply, the first voltage supply being generated at least at times from a battery source, the first voltage supply have a variable voltage level. The system further includes a voltage regulator, the voltage regulator coupled to the first voltage, the voltage regulator regulating the first voltage to provide a voltage regulator output voltage. The system may further include a second voltage supply, the second voltage supply being utilized by at least a portion of the control circuitry of the voltage regulator. The system further comprises a variable third voltage supply, the third voltage supply being utilized by at least a portion of the drive circuitry of the voltage regulator, the drive circuitry providing a control signal coupled to the control terminal of an output transistor of the voltage regulator. A voltage level of the variable third voltage supply is dependent upon a voltage level of the first voltage supply.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 3:
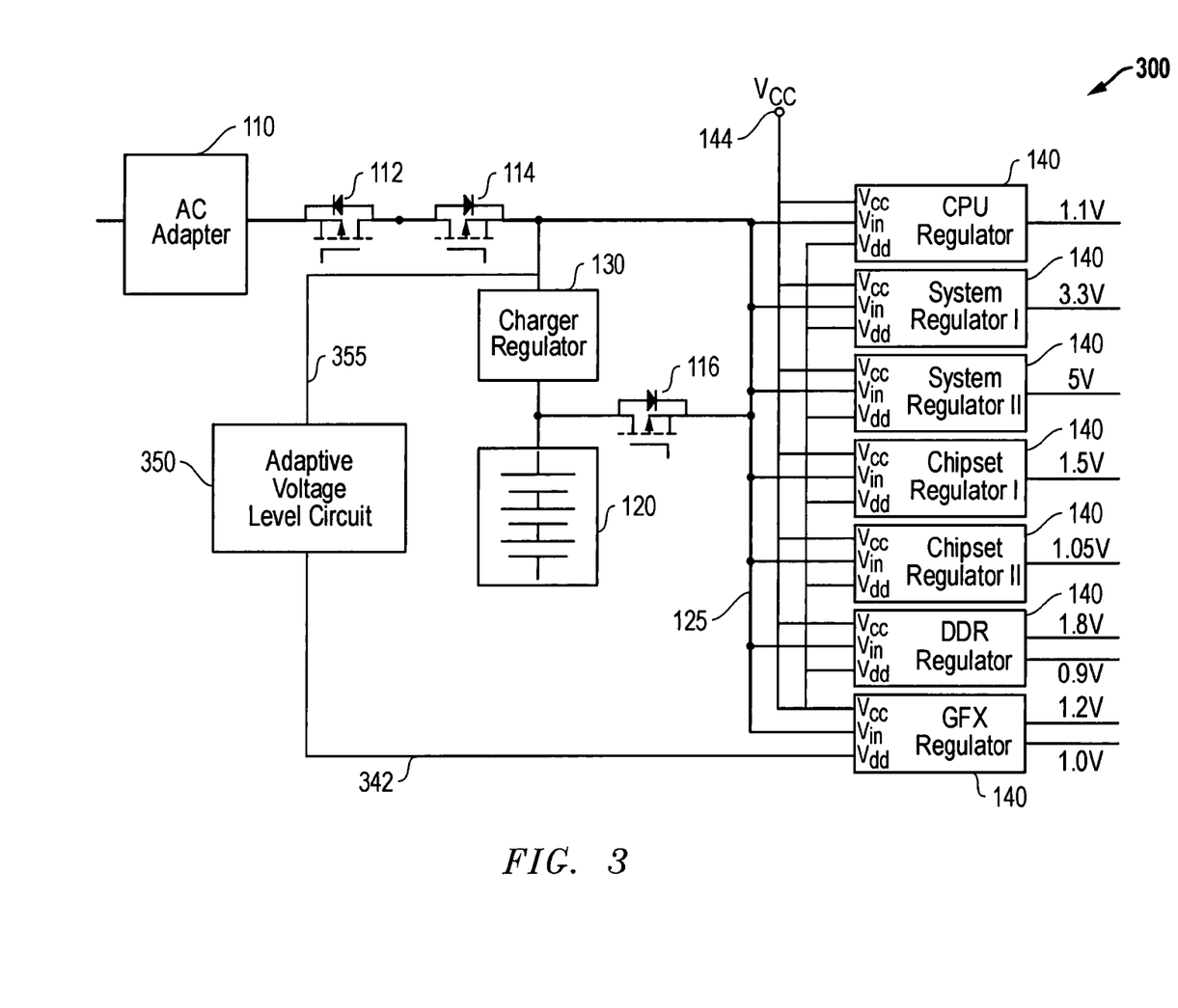
FIG. 3 illustrates exemplary circuitry for an information handling system having a battery power supply and adaptive drive voltage control of the voltage regulators.

FIG. 3 illustrates one example of a battery supported power supply system 300 that may be utilized in an information handling system to take advantage of the techniques disclosed herein. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The battery supported power supply system 300 of FIG. 3 provides for an improved battery life by improving the voltage regulation efficiency as compared to prior art systems, even when the input voltage to the voltage regulators may vary widely. In the techniques disclosed, the voltage supply Vdd that is utilized for the drive control circuitry of the voltage regulators is varied in relation to variations in the input voltage Vin. In one example, an inverse relationship may be established between the input voltage level and the voltage supply Vdd level that is used for the gate drive circuitry that controls the gates of regulator output transistors.

The techniques described herein provide an improved battery life by improving the regulator output transistor MOSFET conduction loss. More particularly, the MOSFET conduction loss that results from the MOSFET Rds(on) is proportional to the MOSFET drive voltage Vgs. Further, typically the power circuitry MOSFETs and the MOSFET drive circuitry are designed to accommodate a maximum drain to source voltage (Vds) stress that results from the maximum Vin voltage (in an example described below approximately 20V), gate drive voltage level, drive speed and some of parasitics. Usually, Vds is significantly effected by power circuitry input voltage Vin. However, the maximum Vin voltage is not always utilized. In particular, when using a battery source the Vin voltage may vary over the battery discharge life cycle and may drop significantly below the maximum Vin, such as for example as described below to approximately 9V. In such circumstances, a lower Vin, allows for the gate voltage of an output MOSFET of the voltage regulator to be increased while still maintaining the MOSFET within the maximum Vds voltage stress level. Advantageously, increasing the gate voltage drive level decreases the MOSFET Rds (on) which results in less MOSFET conduction loss and accordingly an improved battery life.

Figure 4:
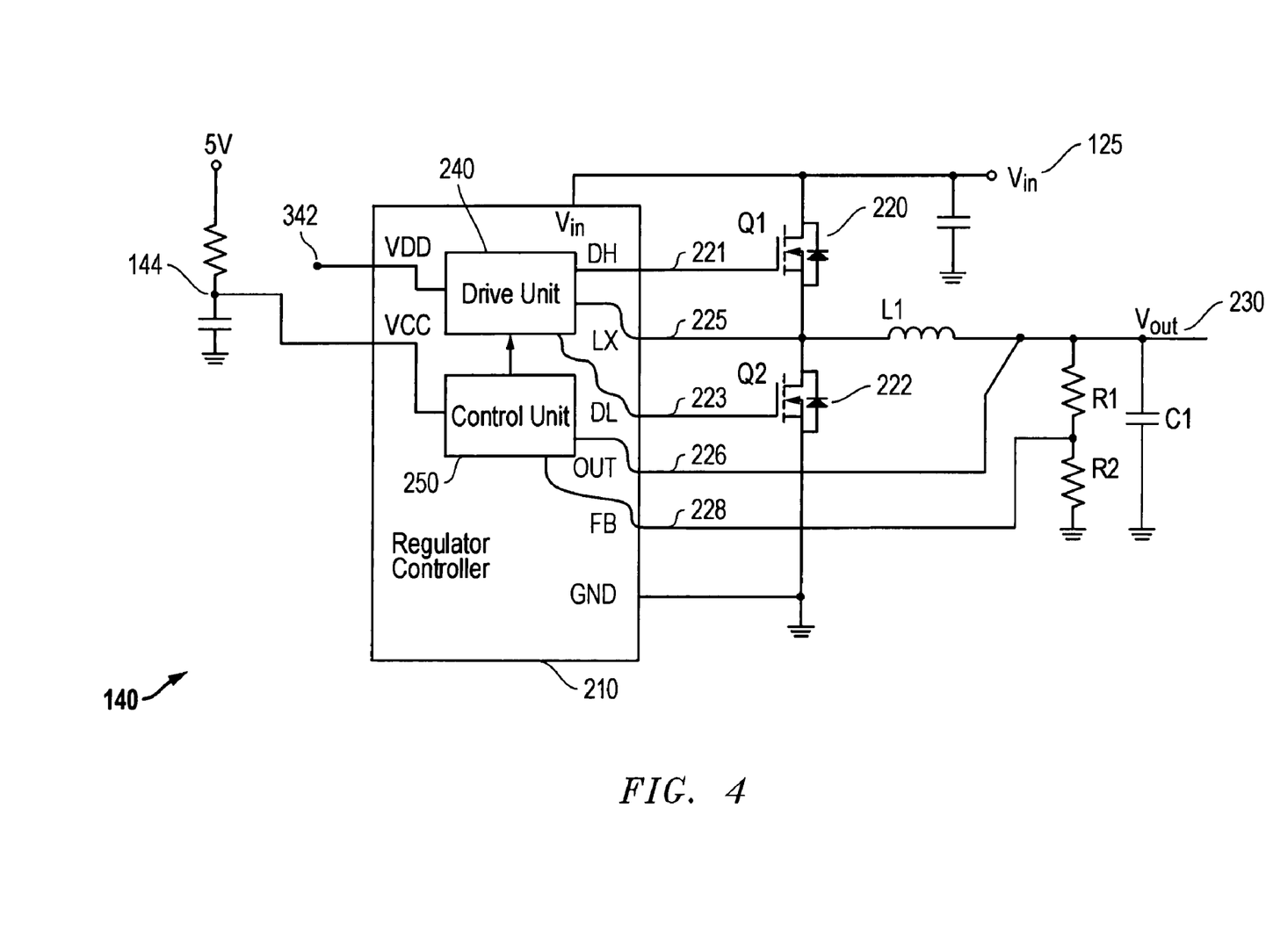
FIG. 4 illustrates a voltage regulator having supply voltages provided in accordance with the techniques disclosed herein.
Figure 5:
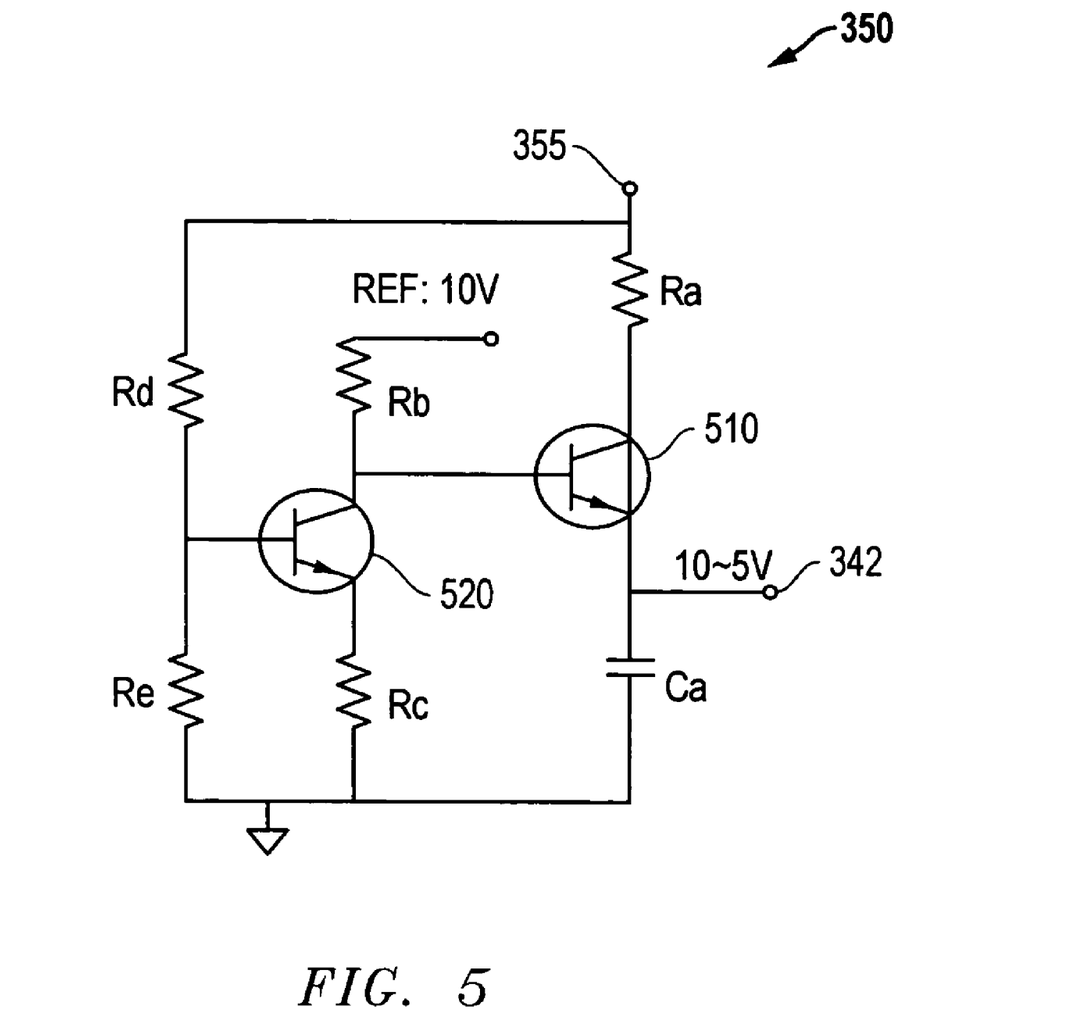
FIG. 5 illustrates an exemplary circuit for use in adaptively setting the drive voltage control.

The concepts described above may be better understood with regard to the exemplary descriptions of FIGS. 3-5. As shown in FIG. 3, the battery supported power supply system 300 has many of the same elements of the system of FIG. 1 with like referenced elements having the same reference numerals. The power supply system 300 differs from the system of FIG. 1 in that a variable Vdd voltage supply is provided. In particular, the Vcc voltage supply 144 may be provided as set voltage level similar to that shown in the prior art. However, the Vdd voltage supply 342 is provided as an adaptive voltage that may vary depending upon the level of the Vin 125 voltage. In one example, as Vin 125 varies from 20-9V, the Vdd voltage supply 342 will correspondingly inversely vary from 5-10V. To control the voltage level of the Vdd voltage supply 342, an adaptive voltage level circuit 350 is provided. The adaptive voltage level circuit 350 may receive an input 355 that is coupled to the Vin 125 line. The adaptive voltage level circuit 350 is designed so that it provides as an output the variable Vdd voltage supply 342 in a manner such that the level of the Vdd voltage supply 342 varies depending upon the voltage level of Vin 125.

More details of this concept may be seen with regard to FIG. 4 which illustrates the voltage regulator 140 receiving de-coupled Vdd and Vcc supply voltages. The circuitry of FIG. 4 may be similar to that of FIG. 2 again with like referenced numerals except as can be seen in FIG. 4, the variable Vdd voltage supply 342 is provided to support the drive unit of regulator integrated circuit 210. Using the example voltages described above, as the voltage level of Vin 125 varies from 20-9V, the voltage level of the Vdd voltage supply 342 provided to the drive circuitry 240 as a supply voltage may vary from 5-10V respectively. The drive circuitry may include a variety of circuits that provide the gate drive voltages for MOSFETs 220 and 222. In one embodiment the drive circuitry may comprise control logic and drive stage that operates at the Vdd rail. By providing an increased Vdd supply, an increased drive voltage may be provided to the MOSFET gate drive transistors and the MOSFET conduction loss will be correspondingly decreased since the MOSFET Rds(on) is decreased for increased gate control drive voltages.

As mentioned above, exemplary voltage regulators for use as regulator integrated circuit 210 include the Intersil ISL88550A, Maxim MAX8743 and the Texas Instrument TPS51116. It will be recognized however that the concepts described herein are relevant to a wide range of other regulators and that the regulators discussed herein are merely exemplary. Moreover, though described with relation to a regulator in which Vdd provides the power supply rail for the drive unit, it will be recognized that the drive unit may additionally receive the non-variable Vcc power supply rail such that both voltage rails are provided to the regulator controller. The concepts described herein are still advantageous in such a configuration if the gate drive control voltage level is variable in relationship to the level of Vin.

The variable Vdd voltage supply 342 may be generated in a wide range of manners by any of a variety of circuits which create an output voltage that is related to the input voltage. The specific relationship between Vdd and Vin can be implemented by in many approaches such as digital circuit, analogy circuit or mixed digital-analog circuitry. Thus, the adaptive voltage level circuit 350 is merely exemplary. As described above, it is desirable for the relationship of voltages Vin and Vdd to be an inverse type relationship. For example, the output voltage of the adaptive voltage level circuit 350 may linearly or non-linearly vary with its input voltage. Alternatively, the output voltage of the adaptive voltage level circuit 350 may have several preset incremental output voltage levels from which the desired output voltage level is selected based at least in part upon the voltage level of Vin 125. Further, the adaptive voltage level circuit 350 is shown as receiving the voltage Vin 125 as an input 355. However, it will be recognized that the adaptive voltage level circuit 350 may merely receive some input signal (such as a control signal) that is representative, at least in part, of the current state of Vin 125. For example, a control signal may reflect whether be an AC adaptor is being utilized or whether a battery power is being utilized and the current condition of the battery. Thus, the concepts described herein are not dependent upon how the variable Vdd voltage supply 342 is generated but rather in a broader sense it is merely desirable that voltage level provided to the control terminal of the output transistor (for example the gate of a MOSFET) may be changeable based at least in part upon some state or condition of the Vin 125 power supply. For example, one circuit for use as the adaptive voltage level circuit 350 is shown in FIG. 5. As shown in a FIG. 5 the input 355 may receive an input that varies approximately over 9-20V and the corresponding output provided as variable Vdd voltage supply 342 may respectively vary over 10-5V. The adaptive voltage level circuit may comprise resistors Ra, Rb, Rc, Rd, and Re, capacitor Ca and transistors 510 and 520 configured as shown in FIG. 5. As mentioned above it will be recognized, however, that many other circuits and methods may be utilized to create the variable Vdd voltage supply 342.

Furthermore, although the adaptive voltage level circuit 350 is shown in FIG. 3 as being external to the regulators, in one embodiment the adaptive voltage level circuit 350 may be embedded directly within the regulator 140. One embodiment of including the adaptive voltage level circuit 350 within the regulator 140 involves integrating the adaptive voltage level circuit 350 within the regulator integrated circuit 210. In such an embodiment, the Vin 125 supply provided to regulator integrated circuit 210 may be utilized within the regulator integrated circuit 210 to internally generate the variable Vdd voltage supply 342. In this regard, the Vdd voltage may merely be an internal voltage that is utilized to provide a variable transistor control terminal drive control signal for which its voltage level is adjustable dependent upon the Vin voltage level.

Thus, as described above a more efficient system may be obtained by providing variable control voltage for the regulator power switch drive control signals. In one example, for an AC adaptor provided Vin voltage of 19.5V and a 5V constant supply voltage Vdd, the drain-to-source voltage Vds (max) of the regulator MOSFETs may reach 26.5V while under battery power at 10V the Vds(max) may be only approximately 17V. Increasing the Vdd supply voltage to 10V when the system is supported by a 10V battery power supply reduce the MOSFET conduction loss such that for a regulator with a 1.2V/10 amp output the efficiency may increase by approximately 2%. Such an increase in efficiency will extend the battery discharge life, reduce power dissipation and ease cooling requirements. Thus it is advantageous to provide a system that de-couples the supply voltage levels of the regulator such that at least some circuitry in the regulator system that controls MOSFET gate drive signals may operate at different levels depending upon the level of the Vin voltage that is to be regulated by the regulator.

As described above, a relationship is established between the voltage level of the Vin 125 supply and the voltage level of the Vdd 342 supply so that the drive voltage provided to MOSFETs 220 and 222 likewise varies in relation to the input voltage Vin 125. The particular relationship between the Vin 125 and the MOSFET drive voltages on gate control lines 221 and 223 may be selected dependent upon the characteristics of the MOSFETs 220 and 222, the specified range of Vin 125 and the type/characteristics of the battery utilized within the system. In one embodiment, the circuitry may be configured such that the relationship between the drive voltage and the Vin voltage level is user programmable. Such a characteristic may be particularly useful if the adaptive voltage level circuitry is integrated within the regulator controller as described above.

In the examples described above the variable Vdd voltage supply may be utilized to generate the drive control voltages for both MOSFETs 220 and 222. It will be recognized that various regulator circuits may include more or less MOSFETs. Thus, the concepts described herein may be utilized by adjusting the drive control voltage of a single MOSFET in relation to the Vin voltage level or by adjusting the drive control voltage of more than two MOSFETs. Further, at least some of the benefits described herein may be obtained even if the drive voltage of only some of the MOSFETs is adjusted. In such an approach one or more MOSFETs could utilize the concepts described herein while one or more other MOSFETs do not. For example in the system described with regard to FIG. 4, the MOSFET conduction loss is dominated by the Rds(on) of the MOSFET 222. Thus, a circuit design may be implemented in which the drive control of MOSFET 222 is variable in relation to the Vin 125 voltage level while the drive control of MOSFET 220 is not adjusted, and vice versa. The techniques described herein have been illustrated with regard to MOSFET output devices and Vdd supply adjustments that impact the voltage levels of the gate drive control signals. However, it will be recognized that the adjustable drive control concepts may be utilized with other output devices. For example, bipolar output devices may be utilized in which the voltage levels of the control terminal of a power bipolar transistor is adjusted dependent upon the level of Vin.

In the examples described above, all regulators of the system are shown to advantageously utilize the concepts described herein relating to the variable Vdd voltage supply. However, it will be recognized that higher efficiency described herein will still be obtained if only a subset of the regulators utilized the variable Vdd voltage supply. Thus, some of the system regulators may utilize a variable Vdd supply and some may not.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention. Furthermore, as the techniques and circuits described herein are merely exemplary and other techniques and circuits may be utilized while still providing the benefits of the concepts disclosed herein.

What is claimed is:

1. A method of extending the battery life in a battery supported power supply system having voltage regulation, the method comprising:
   providing a first voltage supply to be regulated, the first voltage supply being generated at least at times from a battery source;
   providing a voltage regulator that receives the first voltage supply; and
   generating a variable drive control voltage that is provided as a power supply to the voltage regulator, the variable drive control voltage varying at least in part in relation to the voltage level of the first voltage supply;
   wherein varying the drive control voltage in relation to the voltage level of the first voltage supply extends the life of the battery.

2. The method of claim 1, wherein the variable drive control voltage controls a control terminal of a transistor.

3. The method of claim 2, wherein a conduction loss of the transistor is varied by varying the drive control voltage such that the efficiency of the voltage regulator changes by varying the drive control voltage.

4. The method of claim 1, wherein the first voltage supply is generated, at times, from an AC power source.

5. The method of claim 4, wherein the battery supported power supply system comprises a plurality of voltage regulators having a plurality of variable drive control voltages that vary at least in part in relation to the voltage level of the first voltage supply.

6. The method of claim 1, wherein the variable drive control voltage varies in an inverse relationship to the first voltage supply.

7. The method of claim 6, wherein the first voltage supply is generated, at times, from an AC power source, the variable drive control voltage having a larger magnitude at least at times when the first voltage supply is generated from the battery source then when the first voltage supply is generated from the AC power source.

8. A method of controlling the output drive control voltage of a voltage regulator, the method comprising:
   providing a first voltage supply to be regulated by the voltage regulator;
   utilizing a control unit voltage as a control unit power supply for at least a portion of the control circuitry of the voltage regulator;
   utilizing a drive unit voltage as a drive unit power supply for at least a portion of the drive circuitry of the voltage regulator, the drive circuitry controlling a drive signal that controls an output transistor of the voltage regulator;
   varying the drive unit voltage such that the drive unit voltage level is dependent at least in part upon the voltage level of the first voltage supply; and
   providing a regulated output voltage from the voltage regulator,
   wherein the efficiency of the voltage regulator is dependent upon the drive unit voltage.

9. The method of claim 8, wherein the drive unit voltage is generated external to a voltage regulator integrated circuit of the voltage regulator.

10. The method of claim 8, wherein the drive unit voltage is generated within a voltage regulator integrated circuit of the voltage regulator.

11. The method of claim 8, wherein a conduction loss of the output transistor is varied by varying the drive unit voltage.

12. The method of claim 11, wherein the drive unit voltage varies in an inverse relation to the voltage level of the first voltage supply.

13. An information handling system, comprising:
a first voltage supply, the first voltage supply being generated at least at times from a battery source, the first voltage supply have a variable voltage level;
a voltage regulator, the voltage regulator coupled to the first voltage, the voltage regulator regulating the first voltage to provide a voltage regulator output voltage;
a second voltage supply, the second voltage supply being utilized by at least a portion of the control circuitry of the voltage regulator; and
a variable third voltage supply, the third voltage supply being utilized by at least a portion of the drive circuitry of the voltage regulator, the drive circuitry providing a control signal coupled to the control terminal of an output transistor of the voltage regulator,
wherein a voltage level of the variable third voltage supply is dependent upon a voltage level of the first voltage supply.

14. The information handling system of claim 13, wherein the first voltage supply may also be generated from an AC power source.

15. The information handling system of claim 13, further comprising a plurality of voltage regulators, each of the plurality of voltage regulators coupled to the first voltage supply, at least two or more of the plurality of voltage regulators each having a variable voltage supply utilized by each voltage regulators drive circuitry, wherein the voltage level of the variable voltage supply varies in relation to the first voltage supply.

16. The information handling system of claim 13, further comprising voltage level adjustment circuitry provided external to a voltage regulator integrated circuit, the voltage level adjustment circuitry having the variable third voltage supply as an output.

17. The information handling system of claim 13, wherein the variable third voltage supply is generated internal to a voltage regulator integrated circuit.

18. The information handling system of claim 13, wherein the output transistor is a first MOSFET device, the MOSFET conduction loss of the MOSFET device varying in relation to the voltage level of the variable third voltage supply.

19. The information handling system of claim 18, further comprising a second MOSFET device, each of the first and second MOSFET devices receiving a variable gate control signal that varies in relation to the voltage level of the first voltage supply.

20. The information handling system of claim 13, wherein the second voltage supply has a constant voltage level.

* * * * *